US009402209B1

(12) United States Patent
Vivanco et al.

(10) Patent No.: US 9,402,209 B1
(45) Date of Patent: Jul. 26, 2016

(54) UTILIZING LINEAR NETWORK CODING IN PACKET DELIVERY

(71) Applicant: Sprint Communications Company L.P., Overland Park, KS (US)

(72) Inventors: Daniel Alberto Vivanco, Sterling, VA (US); Krishna Datt Sitaram, Chantilly, VA (US)

(73) Assignee: Sprint Communications Company L.P., Overland Park, KS (US)

(*) Notice: Subject to any disclaimer, the term of this patent is extended or adjusted under 35 U.S.C. 154(b) by 130 days.

(21) Appl. No.: 13/908,169

(22) Filed: Jun. 3, 2013

(51) Int. Cl.
  *H04W 36/00* (2009.01)
  *H04W 36/02* (2009.01)
  *H04L 1/00* (2006.01)

(52) U.S. Cl.
  CPC ......... *H04W 36/0011* (2013.01); *H04L 1/0009* (2013.01); *H04W 36/026* (2013.01)

(58) Field of Classification Search
  CPC .................. H04W 40/36; H04L 2012/5672
  USPC ........................................................ 370/331
  See application file for complete search history.

(56) References Cited

U.S. PATENT DOCUMENTS

| | | | | | |
|---|---|---|---|---|---|
| 5,365,520 | A * | 11/1994 | Wang | ............. | H04B 7/185 370/217 |
| 6,996,079 | B1 * | 2/2006 | Bergenwall et al. | ........ | 370/331 |
| 8,380,193 | B2 * | 2/2013 | Chen et al. | ........ | 455/435.2 |
| 8,559,388 | B2 * | 10/2013 | Viorel et al. | ........ | 370/331 |
| 8,588,793 | B2 * | 11/2013 | Tomici et al. | ........ | 455/445 |
| 8,818,433 | B2 * | 8/2014 | Steer et al. | ........ | 455/466 |
| 2005/0025164 | A1 * | 2/2005 | Kavanagh et al. | ........ | 370/401 |
| 2005/0163078 | A1 * | 7/2005 | Oba et al. | ........ | 370/331 |
| 2006/0221946 | A1 * | 10/2006 | Shalev | .......... | H04L 69/16 370/389 |
| 2007/0110015 | A1 * | 5/2007 | Chakraborty et al. | ........ | 370/338 |
| 2007/0147282 | A1 * | 6/2007 | Fodor et al. | ........ | 370/328 |
| 2008/0089287 | A1 * | 4/2008 | Sagfors et al. | ........ | 370/331 |
| 2008/0225793 | A1 * | 9/2008 | Wang | .......... | H04W 36/0016 370/331 |
| 2009/0238116 | A1 * | 9/2009 | Chaponniere et al. | ........ | 370/328 |
| 2010/0046542 | A1 * | 2/2010 | van Zelst et al. | ........ | 370/465 |
| 2011/0038284 | A1 * | 2/2011 | Senarath et al. | ........ | 370/279 |
| 2011/0222486 | A1 * | 9/2011 | Hart | .......... | 370/329 |
| 2013/0003697 | A1 * | 1/2013 | Adjakple et al. | ........ | 370/331 |
| 2013/0114481 | A1 * | 5/2013 | Kim et al. | ........ | 370/310 |
| 2014/0269289 | A1 * | 9/2014 | Effros et al. | ........ | 370/231 |

OTHER PUBLICATIONS

Li, Shuo-Yen Robert et al., "Linear Network Coding", Feb. 2003, IEEE Transactions on Information Theory, vol. 49, No. 2. pp. 371-381.*

* cited by examiner

*Primary Examiner* — Noel Beharry
*Assistant Examiner* — Rodrick Mak (57) ABSTRACT

Systems and methods for utilizing linear network coding to efficiently transfer data packets among components within a telecommunications network are provided. In embodiments, a gateway and source cell of a telecommunications network may utilize linear network coding to create a linear combination of data packets ("encoded data packets"). The encoded data packets may be sent to a target cell, where the target cell may decode the data packets. The target cell may send the decoded packets in sequential order to a user device.

20 Claims, 9 Drawing Sheets

UTILIZING LINEAR NETWORK CODING IN PACKET DELIVERY

SUMMARY

A high level overview of various aspects of the invention is provided here for that reason, to provide an overview of the disclosure and to introduce a selection of concepts in a simplified form that are further described below in the detailed description section. This summary is not intended to identify key features or essential features of the claimed subject matter, nor is it intended to be used as an aid in determining the scope of the claimed subject matter.

In brief, and at a high level, this disclosure describes, among other things utilizing network coding to efficiently transfer data packets among components within a telecommunications network. In embodiments, a gateway and a source cell of a telecommunications network may utilize network coding to create a linear combination of data packets ("encoded data packets"). The encoded data packets may be sent to a target cell, where the target cell may decode the data packets and send the decoded packets to a user device in a sequential order.

BRIEF DESCRIPTION OF THE DRAWINGS

The present invention is illustrated by way of example and not limitation in the accompanying figures in which like references numerals indicate similar elements and in which.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

In a telecommunications environment, a user device may communicate with different cells based on a geographic location and a strength of a connection with each cell. When the user device moves from one geographic location to another geographic location, the data associated with the user device may be transferred from one cell to another cell in what is referred to as a handover process. During a handover process, data packets associated with the user device may be transferred from a source cell and/or a gateway to a target cell in a sequential order of the data packets. The sequential order of the data packets may be the order the data packets were received in at the gateway. Additionally, the sequential order may be used by various components within a telecommunications environment to determine if a data packet is missing. In some instances, data packets traveling from the gateway and/or source cell may arrive at the target cell out of order. Such instances may arise when data packets are sent from the gateway along two different paths (e.g., a direct path and a forwarding path) to the target cell. For instance, a first data packet traveling along the forwarding path may arrive after a second data packet traveling along the direct path. Data packets arriving out of order is referred to as packet reordering.

In some instances, when a user device uses Transmission Control Protocol (TCP) to communicate with the sender, the user device may receive one or more data packets that are out of order, the user device may send duplicate acknowledgments ("dupAcks") to a sender of the data packets. For example, when a first data packet arrives, the user device sends an acknowledgment requesting the next data packet, which is the second data packet. However, in cases of packet reordering, instead of the second packet being received next, a third data packet is received. The receipt of the third data packet and lack of receipt of the second data packet indicates to the user device that the second data packet is missing. Because the second data packet is indicated as missing, the user device may send a second acknowledgment for the second data packet. The second acknowledgment for the second data packet is a duplicate acknowledgment, as an acknowledgment for the second data packet was sent when the first data packet was received.

Additionally, a sender may consider a receipt of three duplicate acknowledgments as an indication that a data packet is missing. Consequently, the user device will request a fast retransmission of the missing packet to the sender. However, in cases where the data packet simply arrives out of order, the request for a fast retransmission is unnecessary as the packet is not actually missing. A request for a fast retransmission of a data packet that is not missing, but simply out of order, is referred to as a false fast retransmission.

In circumstances of packet reordering, and in the context of TCP-protocol, duplicate acknowledgements and false fast retransmissions cause unnecessary delays in the telecommunications network. Specifically a Transmission Control Protocol (TCP) window may be shrunk which may yield drastic throughput reduction and excessive delays. Additionally, bandwidth may be wasted because a sender may resend data packets that were not lost.

Aspects of the present invention relate to utilizing linear network coding techniques to linearly combine data packets. In addition to other advantages, by linearly combining data packets, a receiver, such as a user device, may be prevented and/or delayed from determining that data packets arrive out of order. Without data packets being determined as arriving out of order, the number of duplicate acknowledgments and false fast retransmissions may be reduced or eliminated, unnecessary delays may be avoided, and the efficiency of data transfer and handovers may be improved.

Accordingly, in one aspect, an embodiment of the present invention is directed to computer-readable media having computer-executable instructions embodied thereon that, when executed, perform a computer-implemented method for encoding a set of data packets at a gateway of a telecommunications network. The method includes determining that a handover command has been generated, encoding the set of data packets utilizing linear network coding, and sending the encoded set of data packets to a target cell.

In another aspect, an embodiment of the present invention is directed to computer-readable media having computer-executable instructions embodied thereon that, when executed, perform a computer-implemented method for encoding a set of data packets at a source cell of a telecommunications network. The method includes determining to encode a first set of data packets based on determining that a handover command has been generated and determining that the first set of data packets are not encoded with linear network coding. The method further includes encoding the first set of data packets utilizing linear network coding.

In yet another aspect, an embodiment of the present invention is directed to computer-readable media having computer-executable instructions embodied thereon that, when executed, perform a computer-implemented method for decoding a set of data packets at a target cell of a telecommunications network. The method includes receiving the set of data packets and determining that the set of data packets are linearly combined by an application of one or more linear equations. The method further includes decoding the set of data packets by solving the one or more linear equations and sending the set of data packets to a user device in sequential order.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

| | |
|---|---|
| 3G | Third-Generation Wireless Telephone Technology |
| 4G | Fourth-Generation Wireless Telephone Technology |
| ANR | Automatic Neighbor Relations |
| CDMA | Code Division Multiple Access |
| CD-ROM | Compact Disk Read Only Memory |
| CRM | Customer Relations Management |
| DNS | Domestic Network Server |
| DVD | Digital Versatile Discs |
| ECGI | Evolved Universal Radio Access Cell Global Identifier |
| EEPROM | Electrically Erasable Programmable Read Only Memory |
| ENODEB | Evolved Node B |
| EPC | Evolved Packet Core |
| E-UTRAN | Evolved Universal Terrestrial Radio Access Network |
| GPRS | General Packet Radio Service |
| GPS | Global Positioning System |
| GSM | Global System for Mobile Communications |
| iDEN | Integrated Digital Enhanced Network |
| IP | Internet Protocol |
| LTE | Long Term Evolution |
| MME | Mobility Manage Equipment |
| MSC | Mobile Serving Center |
| MMS | Multimedia Messaging Service |
| PC | Personal Computer |
| PCI | Physical Cell Identity |
| PCS | Personal Communications Service |
| PDA | Personal Digital Assistant |
| PDN | Packet Network Data |
| PLMN | Public Land Mobile Network |
| RAM | Random Access Memory |
| RF | Radio Frequency |
| ROM | Read Only Memory |
| SGW | Serving Gateway |
| SLA | Service Level Agreement |
| SMS | Short Message Service |
| SON | Self-Organizing Network |
| TCP | Transmission Control Protocol |
| TDMA | Time Division Multiple Access |
| UMTS | Universal Mobile Telecommunications Systems |
| VoIP | Voice over IP |
| Wi-Fi | Wireless Fidelity |
| WiMAX | Worldwide Interoperability for Microwave Access |

Further, various technical terms are used throughout this description. An illustrative resource that fleshes out various aspects of these terms can be found in Newton's Telecom Dictionary, 25th Edition (2009).

Embodiments of the present invention can take the form of a method, system, or computer-readable media embodied with a specific set of computer-executable instructions. Computer-readable media include both volatile and nonvolatile media, removable and nonremovable media, and contemplate media readable by a database, a switch, and various other network and computing devices. Computer-readable media include media implemented in any method or technology that stores information. Examples of stored information include computer-useable instructions, data structures, program modules, and other data representations. Examples of computer-readable media include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. The computer-readable media can store data momentarily, temporarily, or permanently.

Figure 1:
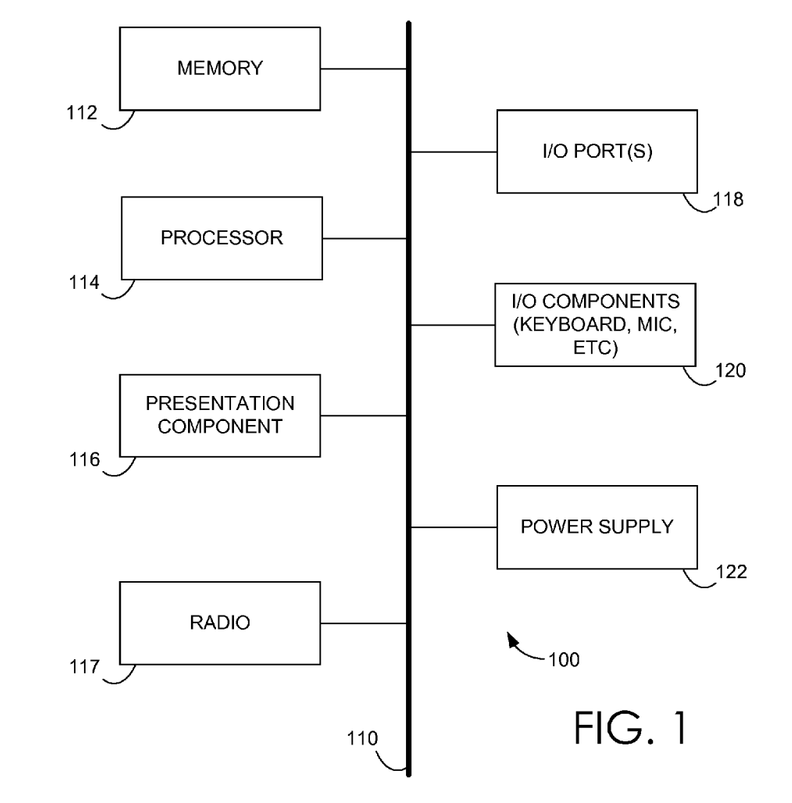
FIG. 1 depicts an illustrative device suitable for use in connection with embodiments of the present invention.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, further elaboration will not be provided here, only to say that memory component 112 can include any type of medium that is capable of storing information in a manner readable by a computing device. In one embodiment, memory 112 includes a set of embodied computer-executable instructions 113 that, when executed, facilitate various aspects disclosed herein. These embodied instructions will variously be referred to as "instructions 113" or "application 113" for short.

Processor 114 might actually be multiple processors that receive instructions 113 and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like. Radio 117 might additionally or alternatively facilitate other types of wireless communications including Wi-Fi, WiMAX, LTE, or other VoIP communications. As can be appreciated, in various embodiments, radio 117 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power mobile device 100.

Aspects of the present invention relate to utilizing linear network coding to efficiently transfer data packets among components within a telecommunications network. In embodiments, a gateway and a source cell of a telecommunications network may include an algorithm that applies network coding to data packets creating a linear combination of the data packets ("encoded data packets"). The encoded data packets may be sent to a target cell, where the target cell may decode the data packets. The decoded data packets may be sent in sequential order to a user device by the target cell.

A gateway may be a serving gateway (SGW) or a packet data network gateway (PDN). Generally, a serving gateway may route and forward data packets associated with a user device to various components within a network. Additionally, the serving gateway may also act as the mobility anchor for the user device during handovers and as the anchor for mobility between LTE and other 3GPP technologies. A PDN gateway may provide connectivity from the user device to external packet data networks by being the point of exit and entry of traffic for the user device.

A source cell may be, among other things, a cell that a user device is in communication with in order to maintain connection with a telecommunications network. A source cell may hold data associated with the user device to maintain connection with the user device. A target cell may be, among other things, a cell that a user device is attempting obtain a connection with in place of the connection with the source cell. User device data held at the source cell may be transferred to the target cell in a handover process.

A user device may take on a variety of forms, such as a personal computer (PC), a laptop computer, a tablet, a netbook, a mobile phone, a Smart phone, a personal digital assistant (PDA), or any other device that is capable of communicating with other devices. For example, a user device can take on any form, such as, for example, a mobile device or any other computing device capable of wirelessly communicating with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, a user device comprises a wireless or mobile device with which a wireless telecommunication network(s) can be utilized for communication (e.g., voice and/or data communication). In this regard, the user device may be any mobile computing device that communicates by way of, for example, a 3G or 4G network.

Linear network coding allows any node in a network to extract information from one data packet, mix it with information from a local cache of data packets, and then generate another newly encoded data packet to be transmitted to another location and/or component of a network. In linear network coding, one or multiple linear equations are applied to data packets creating several linear combinations of the data packets. As linearly combined, the encoded packet may contain information from one or several of the data packets. The receiver of these encoded packets may forward the encoded data packets as is, or decode the data packets. Encoded data packets may include decoding-information within the data packet header to help a decoder reconstruct the original data packets. For instance, the number of total encoded packets (i.e. the number of linear combinations of data packets created and necessary to decode the encoded data packets) may be stored in the header. Linear network coding effectively removes the notion of ordering from a sequence of data packets; if there is no ordering, then there can be no reordering. In addition, a large number of linear combinations can help compensate and ensure that the losses are masked from a user device.

Aspects of the present invention allow for data packets associated with a handover process to be delivered to a user device in a specified order. The specific order may be the order in which the data packets arrived at a gateway. Additionally, the specific order may be used to indicate to a user device or other components within a telecommunications environment, whether a data packet is missing.

In aspects of the present invention, a set of data packets are received at a gateway in a specified order. Using linear network coding, one or multiple linear combinations are applied to the set of data packets such that each data packet of the set of data packets is multiplied by an integer and combined with another data packet that is also multiplied by another integer forming a linear combination of the set of data packets. For instance, a linear combination of an x data packet and a y data packet would be an expression of the form $ax+by$, where a and b are constant integers. Note that this algebraic operation refers to a Coding Operations (i.e. bitwise logical operation of x and y). Also using linear coding, the sender may include additional coding information (i.e. a and b) into the encoded packet header to help decoder solve the linear equations. The data packets have data associated with a handover process, an ongoing phone call, and/or a data session.

In aspects of the present invention, upon using linear network coding to form linear combinations of the set of data packets, the gateway sends a portion of the set of data packets along a direct path the target cell and a portion of the set of data packets along a forwarding path to the target cell. The data packets sent along the forwarding path arrive at the source cell prior to arriving at the target cell. At the source cell, the data packets are determined to already be encoded. Based on the data packets already being encoded, the source cell sends the data packets to the target cell.

In aspects of the present invention, the target cell, upon receiving the data packets, determines that the data packets are encoded. The target cell may determine that data packets are encoded utilizing network coding by reading the packet header and analyzing whether or not the data packets are linearly combined. If the data packets are linearly combined, then the data packets are already encoded by linear network coding. If the data packets are not linearly combined, then the data packets are not encoded by linear network coding. Upon determining that the data packets are encoded, the target cell decodes the packets by solving the one or several linear equations applied to the set of data packets. Because the target cell needs all of the linearly combined data packets to solve the linear equation, the target cell only sends the data packets to a user device upon receiving all of the data packets and decoding all of the data packets. Additionally, the data packets may be arranged into the specified order in which the data packets were originally arranged at the time they were initially received at the gateway and sent to the user device in the specific order.

In aspects of the present invention, by the target cell receiving all of the linearly combined data packets prior to sending the data packets to the user device, the number of dupAcks and false fast retransmissions sent by the user device may be reduced as the user device would receive all of the data packets. Additionally, the target cell sending the data packets in the specified order in which the data packets were originally arranged at the time they were initially received at the gateway also reduces the number of dupAcks and false fast retransmissions sent by the user device as the data packets would be received in order.

In aspects of the present invention, any number of linear combinations may be formed with the set of data packets. The number of linear combinations formed may be less than or equal to the number of data packets within the set of data packets. The number of linear combinations formed may be greater than or equal to the number of data packets within the set of data packets. Some embodiments include a limit to the number of linear combinations that may be formed. The specified limit may be a specific threshold number of linear combinations of the data packets and/or specific multiples of the number of data packets of the set of data packets. For instance, the specific threshold number of linear combinations may be up to 50 linear combinations of data packets, such that a total of 50 data packets that are linearly combined may be created. In other instances, the specific multiple of the number of data packets may be 2, 4, 6, 8, or 10. For example, in an instance where the limit of the specific multiple of the number of data packets is 5 and a set of data packets includes 3 data packets, the total number of linear combinations that can be formed is 15.

In some embodiments, a gateway is not configured to encode data packets utilizing linear network coding. The gateway is configured to receive data packets and then send the data packets to a target cell through a direct path and/or a forwarding path. Data packets sent along the forwarding path may be encoded at a source cell. The source cell is configured to determine whether or not data packets are encoded by linear network coding. A source cell may determine that data packets are encoded utilizing network coding by reading packet header and analyzing whether or not the data packets are linearly combined. If the data packets are linearly combined, then the data packets are already encoded by linear network coding. If the data packets are not linearly combined, then the data packets are not encoded by linear network coding. Upon determining that the data packets are not encoded and determining that a handover command has been generated, the source cell encodes the data packets using linear network coding. In some embodiments, source cell does not determine whether or not data packets have been encoded. Instead, the source cell blindly encodes data packets based on a determination that a handover command has been generated.

Figure 2:
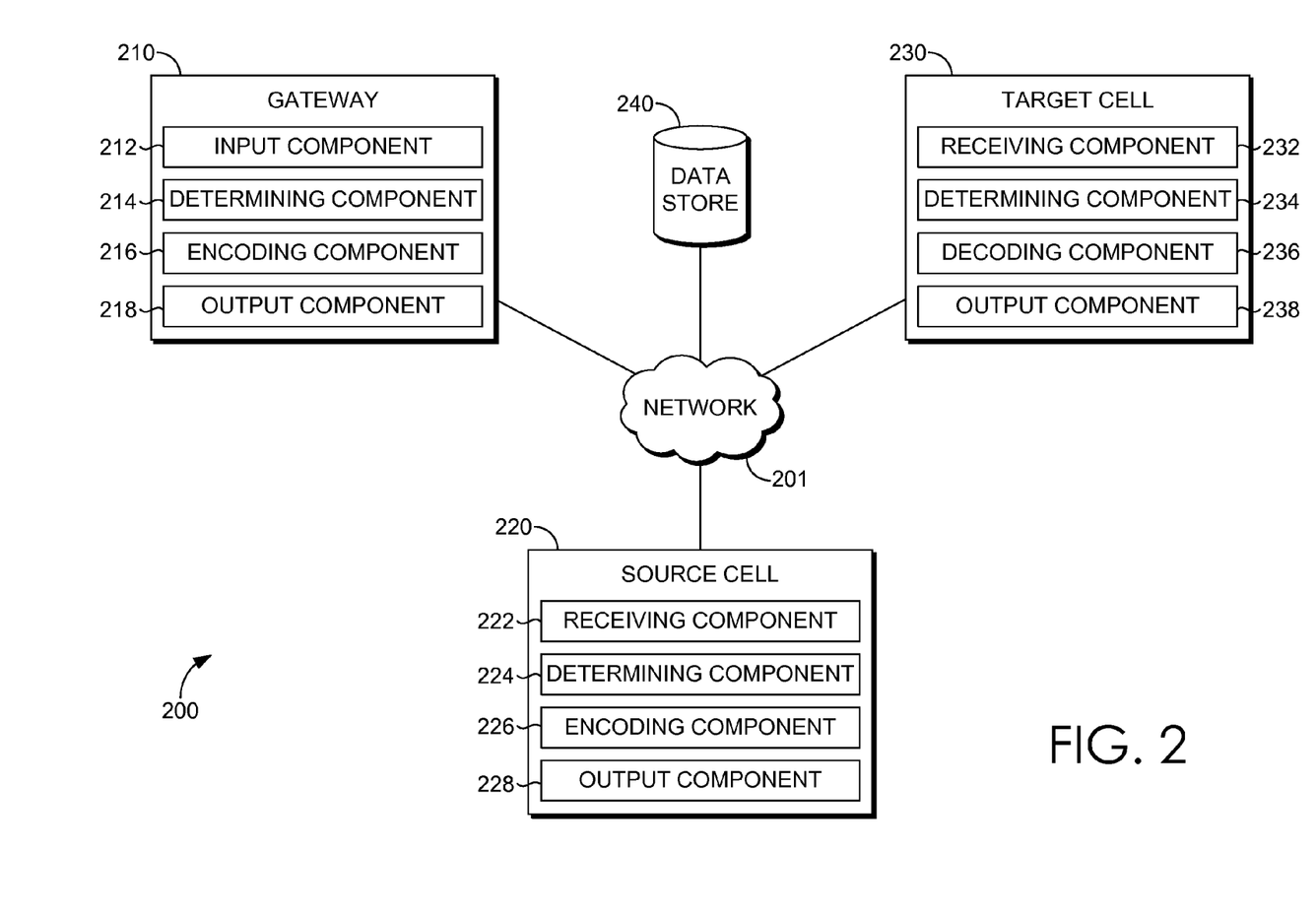
FIG. 2 is a schematic view of an exemplary network environment suitable for performing embodiments of the present invention.

FIG. 2 provides an exemplary network environment suitable for use in implementing embodiments of the present invention. Such a network environment is illustrated and designated generally as network environment 200. Network environment 200 is but one example of a suitable network environment and is not intended to suggest any limitations as to the scope of use or functionality of the invention. Neither should the network environment be interpreted as having dependency or requirements relating to any one or combination of components illustrated. In embodiments, the network environment 200 includes a network 201, a gateway 210, a source cell 220, a target cell 230, and a data store 240.

In embodiments, network 201 is a telecommunications network(s), or a portion thereof. A telecommunications network might include an array of devices or components (e.g., a base station), some of which are not shown so as to not obscure more relevant aspects of the invention. Components such as terminals, links, and nodes (as well as other components) can provide connectivity in some embodiments. Network 201 can include multiple networks, as well as being a network of networks, but is shown in more simple form so as to not obscure other aspects of the present invention. Network 201 can be part of a telecommunications network that connects subscribers to their immediate service provider. In embodiments, network 201 can be associated with a telecommunications provider that provides services (e.g., LTE) to user devices. For example, network 201 may provide voice services to user devices or corresponding users that are registered or subscribed to utilize the services (e.g., LTE) provided by a telecommunications provider. Network 201 can be any communication network providing voice and/or data service(s), such as, for example, a 1× circuit voice, a 3G network (e.g., CDMA, CDMA2000, WCDMA, GSM, UMTS), or a 4G network (WiMAX, LTE, HSDPA).

Data store 240 is configured to store various types of data, including data associated with a handover process. Data store 240 may be located within components of network 201, gateway 210, source cell 220, target cell 230, and/or a user device (not shown). Data stored within data store 240 may be retrieved, received, or the like, by any component within network environment 200 and outside of network environment 200. For instance, an encoding component 216 of gateway 210, may retrieve data packets stored within data store 240 in order to encode the data packets.

In embodiments, gateway 210 includes an input component 212, a determining component 214, an encoding component 216, and an output component 218. Additionally, the gateway 210 may include data store 240. In embodiments, gateway 210 is a serving gateway. In other embodiments, gateway 210 is a PDN gateway.

Input component 212 of gateway 210 may be configured to receive, among other things, an indication that a handover command has been generated, an indication that a handover has been executed, data associated with a handover, and the like. Input component 212 may receive an indication that a handover command has been generated and/or executed from source cell 220, target cell 230, a user device (not shown), and/or any other component within and outside of network environment 200.

Determining component 214 may be configured to, among other things, determine whether a handover command has been generated and/or executed. Determining component 214 may also be configured to determine whether data packets may be encoded. Determining component 214 may determine that data packets may be encoded based on receiving an indication that the handover command has been generated at source cell 220. Additionally, after a process of encoded data packets has begun, determining component 214 may be configured to determine that data packets may cease being encoded based on a completion of a handover process. Further, determining component 214 may be configured to determine that data packets may be sent to source cell 220 and/or target cell 230 using a direct path and/or a forwarding path.

Encoding component 216 is configured to, among other things, encode data packets. In embodiments, encoding component 216 includes algorithm components (not shown). Encoding component 216 may encode data packets utilizing linear network coding, resulting in a linear combination of the data packets ("encoded data packets").

Output component 218 may be configured to, among other things, communicate with network 201, source cell 220, target cell 230, a user device and/or any other component within and outside network environment 200. Output component 218 may also be configured to send data packets to source cell 220 and target cell 230. The data packets sent by output component 218 may be unencoded data packets and/or encoded data packets. As will be described further below, in embodiments, output component 218 sends data packets along a direct path to target cell 230 and/or along a forwarding path to target cell 230.

Source cell 220 includes a receiving component 222, a determining component 224, an encoding component 226, and an output component 228. Additionally, source cell 220 may include data store 240. Receiving component 222 may be configured to, among other things, receive communication and data from gateway 210, target cell 230, a user device, other components within network environment 200, and/or components outside of network environment 200. Receiving component 222 may receive data packets from gateway 210 and/or a release resource indication from target cell 230.

Determining component 224 may be configured to, among other things, determine whether a handover command has been generated and/or executed. Determining component 224 may also be configured to determine whether or not data packets may be encoded. Determining component 224 may determine that data packets may be encoded based on the handover command being generated. Determining component 224 is configured to determine that data packets may cease being encoded based on a handover being executed. Further, determining component 224 may also be configured to determine if data packets are already encoded and may also determine a type of coding the data packets have already been encoded with, such as linear network coding.

Encoding component 226 may be configured to, among other things, encode data packets. In embodiments, encoding component 226 includes algorithm components (not shown). Encoding component 226 may encode data packets utilizing linear network coding, resulting in a linear combination of the data packets. Encoding component 226 may encode data packets that are not encoded or are already encoded by a linear combination. In instances where data packets are already encoded by a linear network coding, encoding component 226 may encode the already encoded data packets using by utilizing subsequent linear network coding.

In embodiments, source cell 220 receives encoded data packets from gateway 210. In additional embodiments, encoding component 226 decodes the encoded data packets prior to sending the data packets to target cell 230.

Output component 228 may be configured to, among other things, communicate with network 201, gateway 210, target cell 230, a user device and/or any other component within and outside network environment 200. Output component 228 may be configured to send data packets to target cell 230. Output component 228 may send data packets to target cell 230 utilizing a communication channel that has been established between source cell 220 and target cell 230. The data packets sent by output component 228 may be unencoded data packets and/or encoded data packets.

Target cell 230 includes a receiving component 232, a determining component 234, a decoding component 236, and an output component 238. Additionally, target cell 230 may include data store 240. Receiving component 232 may be configured to, among other things, receive communication and data from gateway 210, source cell 220, a user device, other components within network environment 200, and/or components outside of network environment 200. Receiving component 232 may receive data packets from gateway 210 and/or source cell 220. The received data packets may be unencoded, decoded, and/or encoded data packets.

Determining component 234 may be configured to, among other things, determine whether or not data packets have been encoded. Determining component 234 may also be configured to determine the number and/or types of coding data packets have been encoded with and how to decode the data packets. Additionally, after data packets have been decoded, determining component 234 may determine and arrange the data packets in a sequential order for delivery to a user device.

Decoding component 236 may be configured to, among other things, decode data packets. In embodiments, decoding component 236 includes algorithm components (not shown). In embodiments where the data packets have been encoded by linear network coding, decoding component 236 decodes data packets by solving the linear combination of the encoded data packets.

Output component 238 may be configured to, among other things, communicate with network 201, gateway 210, source cell 220, a user device and/or any other component within and outside network environment 200. Output component 238 may be configured to send data packets to a user device (not shown) in an order determined by determining component 234. Output component 238 may send data to and/or communicate with source cell 220 by utilizing a communication channel established between source cell 220 and target cell 230. Output component 238 may further be configured to send acknowledgments of receipt of the data packets.

Figure 3:
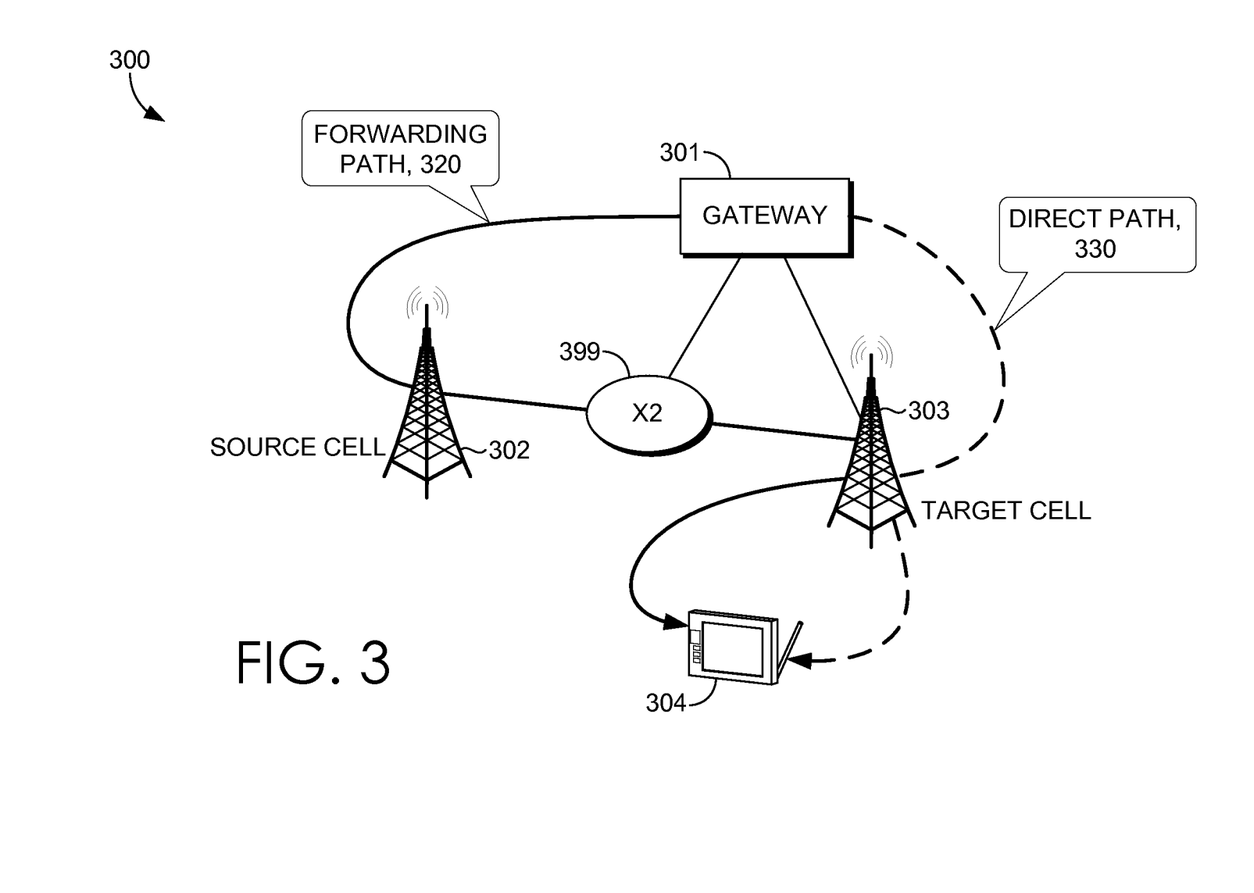
FIG. 3 is a schematic diagram of data paths in accordance with embodiments of the present invention.

Referring now to FIG. 3, an exemplary system 300 includes a gateway 301, source cell 302, target cell 303, and user device 304. Gateway 301 may be similar to gateway 210, source cell 302 may be similar to source cell 220, and target cell 303 may be similar to target cell 230. Shown in FIG. 3 are two data paths, a direct path 330 and a forwarding data path 320. Direct path 330 includes communication directly between gateway 301 and target cell 303. Direct path 330 may further include communication between target cell 303 and user device 304. Forwarding path 320 includes communication between gateway 301 and source cell 302 and communication between source cell 302 and target cell 303. The communication between source cell 302 and target cell 303 may by through an X2 communication protocol 399. Forwarding path 320 may further include communication between target cell 303 and user device 304. In embodiments, where data packets are sent along direct path 330, the data packets travel from gateway 301 directly to target cell 303. In other embodiments, where data packets are sent along the forwarding path 320, the data packets travel from gateway 301 to source cell 302 and then to target cell 303.

Figure 4A:
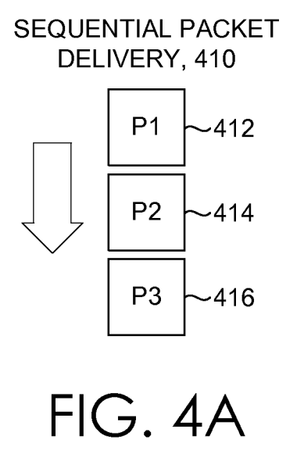
FIG. 4A is a schematic diagram of sequential packet delivery.

FIG. 4A provides an illustration of sequential packet delivery 410. FIG. 4A shows P1 data packet 412, P2 data packet 414, and P3 data packet 416 in sequential order. In sequential packet delivery, data packets P1, P2, and P3 should arrive in sequential order. If data packet P3 arrives prior to data packet P2, dupAcks and/or false fast retransmissions may be generated.

Figure 4B:
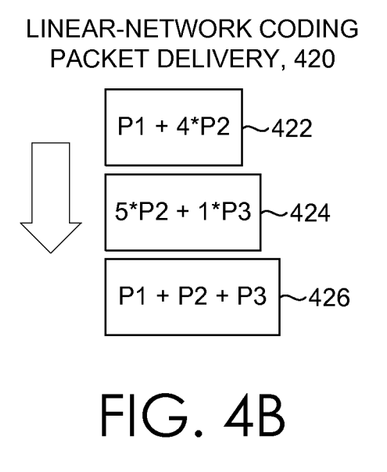
FIG. 4B is a schematic diagram of linear network coding packet delivery, in accordance with embodiments of the present invention.

FIG. 4B provides an illustration of linear network coding packet delivery 420. Linear network coding applies linear network coding techniques to data packets P1, P2, and P3, resulting in a linear combination of the data packets P1, P2, and P3. A linear combination of data packets P1, P2, and P3 are provided at 422, 424, and 426. At 422 data packet P1 is combined with a multiple of data packet P2. At 424, a multiple of data packet P2 is combined with P3. At 426, data packet P1 is combined with data packet P2 and data packet P3.

As shown in FIG. 4B, three linear combinations 422, 424, and 426 are generated. In embodiments, the number of linear combinations may be less than, equal to, or greater than the number of data packets being encoded. For instance, data packets P1, P2, and P3 may be combined into five linear combinations. In some embodiments, a specified limit may be applied to the number of linear combinations. The specified limit may be a specific threshold and/or specific multiples of the number of data packets being encoded. For instance, the specific threshold may be up to 50 linear combinations of data packets. In other instances, the specific multiple of the number of data packets being encoded may be 2, 4, 6, 8, or 10.

Upon a receiver, such as a target cell, receiving the linearly combined data packets, the receiver may decode the data packets by solving the linear equation. Generally, a receiver may user all the linear combinations of the data packets to solve the linear equation. Additionally, a sender of the data packets may include additional coding information in the encoded packet header to help the receiver solve the linear equations. For example, based on FIG. 4B: [1,4], [5,1], [1,1,1] are included in an encoded packet header in order to help solve the linear equations.

Figure 5:
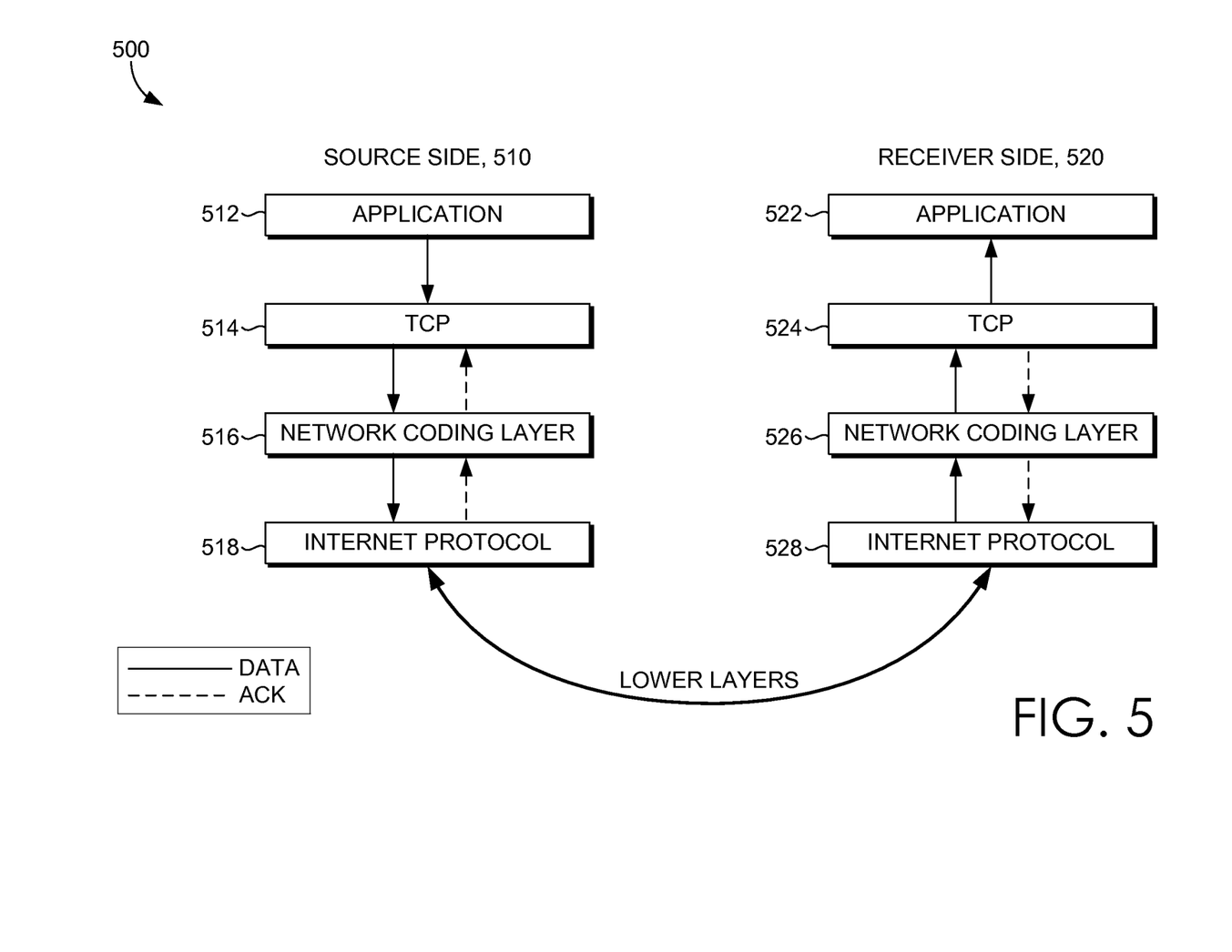
FIG. 5 is a schematic diagram depicting network coding layers, in accordance with embodiments of the present invention.

Referring now to FIG. 5, a diagram illustrates network coding in system 500. System 500 includes a source side 510, where the source side includes application 512, TCP 514, Network Coding Layer 516, and Internet Protocol 518. System 500 also includes receiver side 520, where receiver side 520 includes application 522, TCP 524, network coding layer 526, and Internet Protocol 528. In embodiments, network coding layers 516 and 526 are defined between TCP 514 and Internet Protocol 518, and/or TCP 524 and Internet Protocol 528, respectively. Generally, network coding can be defined as coding above the physical layer in a packet network.

Figure 6:
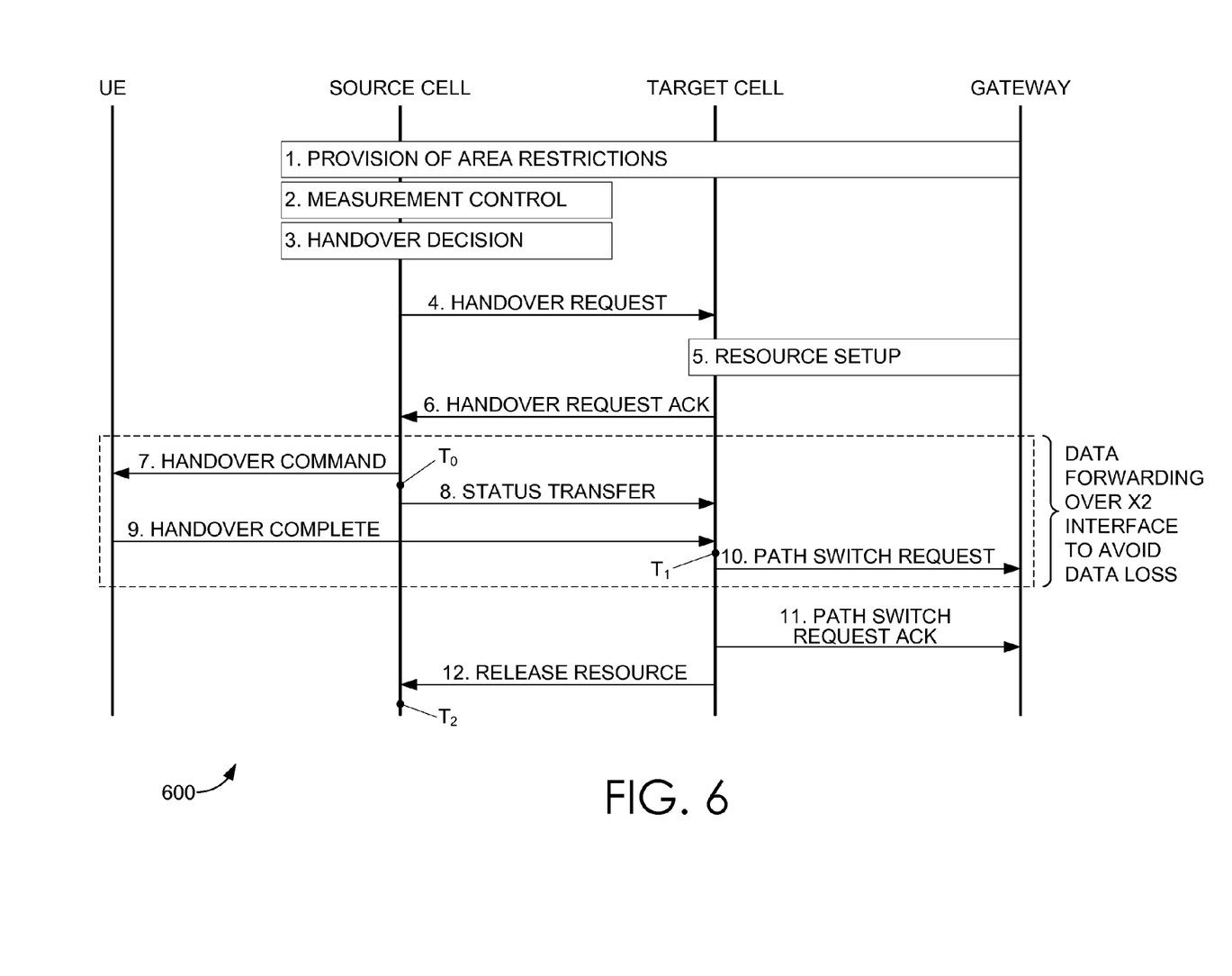
FIG. 6 is a schematic diagram of an exemplary handover process, in accordance with embodiments of the present invention.

FIG. 6 includes a diagram illustrating an exemplary handover process 600. Generally, a handover process begins when a mobile device receives a stronger signal from a target cell than from a source cell. The mobile device informs the source cell about the stronger signal from the target cell and the source cell decides to transfer data associated with the user device from the source cell to the target cell in a handover, as described in steps 1-3 of FIG. 6. When the source cell makes the handover decision, the source cell makes a handover request to the target cell, as provided at step 4. The handover request to the target cell is transmitted using a communication link established between the source cell and the target cell, sometimes referred to as an "X2 communication protocol." When the target cell received the handover request the target cell checks the availability of resources in the target, as shown at step 5. If there are available resources, the target transmits a handover request acknowledgment, indicating that that target cell can take on the user device, as shown at step 6. Upon receiving the handover request acknowledgement that source cell transmits a handover command to the user device over the air interface, as shown at step 7. The source cell can begin forwarding data packets to the target cell and user device, as shown at step 8. Upon reception of the handover command, the user device starts a random access procedure to the target cell. When the user device has successfully gained random access to the target cell, the user device gets an allocation grant from the target cell. Upon reception of the grant from the target cell, the user device provides a handover complete message to the target cell, which is now acting as a new source cell for the user device, as shown in step 9. Upon reception of the handover complete message from the user device, the new source cell provides a handover complete message to a mobility management entity and a path switch request, as shown at step 10. At the reception of the handover complete message and path switch request, the mobility management entity triggers a switching of path for data packets for the mobile terminal to be handed over. The mobility management entity notifies the new source cell of the path switching through a handover complete acknowledgement. The new source cell notifies the (previous) source cell by transmitting a release resource message signaling an end of the handover process, as shown at step 12.

In accordance with certain embodiments of present invention, encoding of data packets begins upon a handover command being generated, as shown at step 7 of FIG. 6. The encoding ends at the completion of the handover process, as shown at step 12. Additionally, FIG. 6 provides three key time periods relevant to embodiments of the present invention. During a handover process, a user device may detach from a source cell. Next, the source cell may establish a communication channel with a target cell. Using the established communication channel, the source cell may forward data packets, where the data packets may be buffered and newly arrived, to a user device through the target cell. Time interval $T_0$ is the time interval where the data packets are being forwarded to the user device. Time interval $T_1$ is the time interval associated with the target cell sending to a gateway a path-switch request. Data packets arriving at the gateway after time $T_1$ are delivered to the user device through the target cell using the direct path from the gateway to the target cell. At time $T_2$, the target cell requests the source cell to release all user device content, indicating that the handover process is complete. Algorithm components may be placed at a source cell, gateway, and target cell. Algorithm components may include encoding and decoding components and may signal each other at times $T_0$, $T_1$, and $T_2$.

Figure 7:
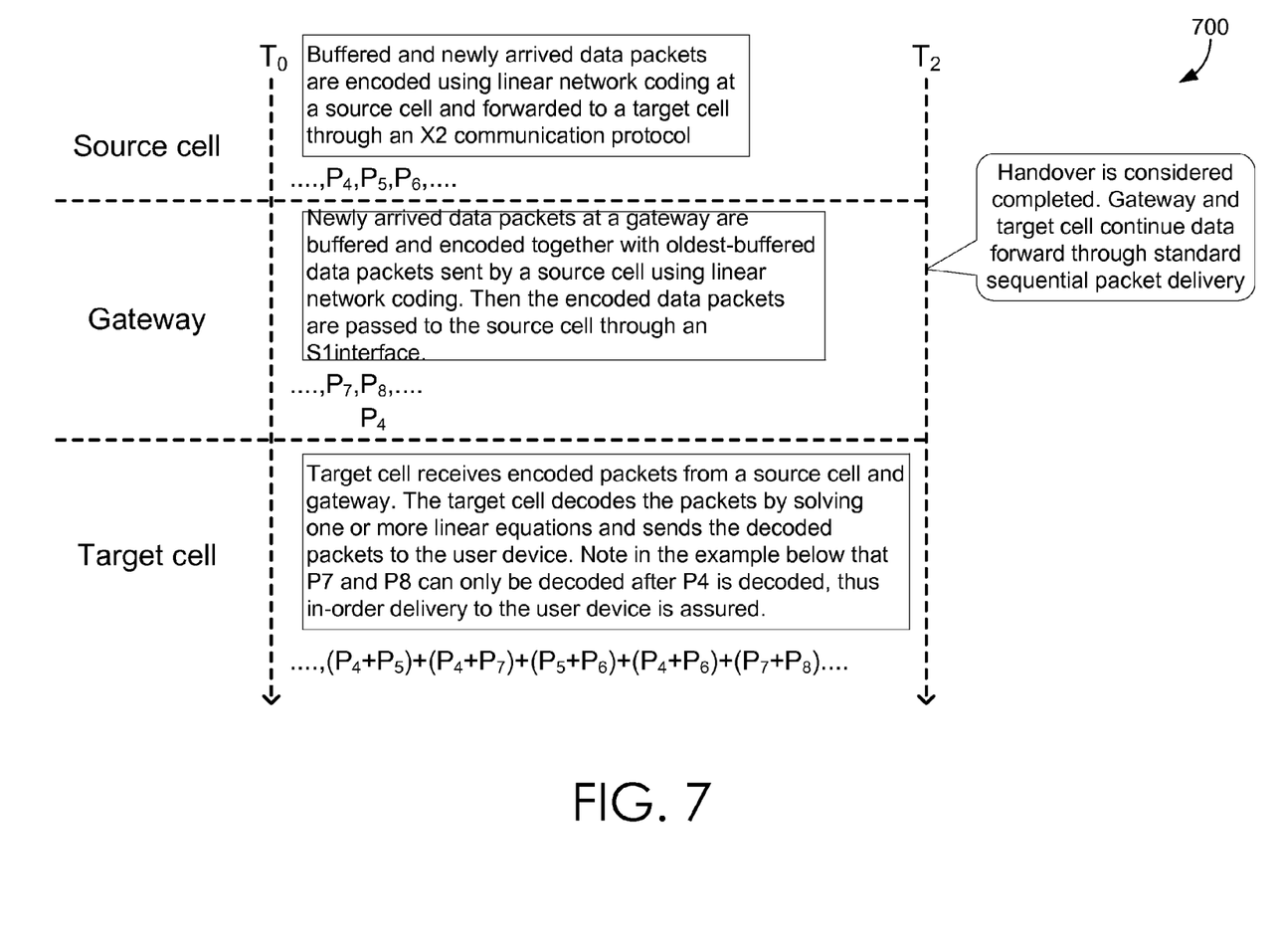
FIG. 7 is a schematic diagram of an exemplary timeline of linear network coding, in accordance with embodiments of the present invention.

In reference to FIG. 7, in some embodiments, at time $T_0$ the following actions are taken, in any order or sequentially. A source cell may stop data forwarding through standard sequential packet delivery and start encoding buffered and newly arrived data packets. Then a source cell may notify a gateway and a target cell that the source cell has stopped data forwarding through standard sequential packet delivery and that the data packets are being encoded. The source cell may share a linear network coding setting so that the gateway and target cell may use the same encoding/decoding methodology as the source cell. In addition, the source cell may send the oldest-buffered packet to the gateway as KEY-encoder, then wait for corresponding acknowledgments. The gateway also encodes arriving data packets in a similar manner and passes them down to the user device. The source cell reads the data packet header received from a gateway to identify whether the data packet has been encoded by the gateway. If yes, the source cell forwards the encoded data packets the target cell. This step can be skipped allowing the source cell to blindly apply linear network coding to the encoded packets based on the handover command being generated. However, encoded data packets that have been encoded more than once may result in higher decoding latency at the target cell. The source cell may forward encoded data packets (encoded by the source cell and/or gateway) to the target cell. The target cell decodes these packets and passes the decoded packets to the user device.

In embodiments, at time $T_1$ (not indicated in FIG. 7) the following actions are taken in any order or sequentially. A gateway is asked to send encoded packets to a target cell. The target cell decodes data packets received from gateway and source cell seamlessly since all three of the target cell, source cell, and gateway are using the same encoding/decoding methodology. Then the target cell passes the data packets to the user device.

In reference to FIG. 7, in embodiments, at time $T_2$ the following actions are taken in any order or sequentially. The target cell notifies the gateway and source cell that a handover process is completed, thus the encoding process should be stopped. Based on the completion of the handover process, the gateway and target cell forward data using standard sequential packet delivery.

Additionally, in some embodiments data packets may be linearly combined such that, higher numbered packets, such as data packets P7 and P8, can only be decoded after lower numbered packets, such as data packet P4, are decoded. Thus, in-order delivery to the user device is assured.

Figure 8:
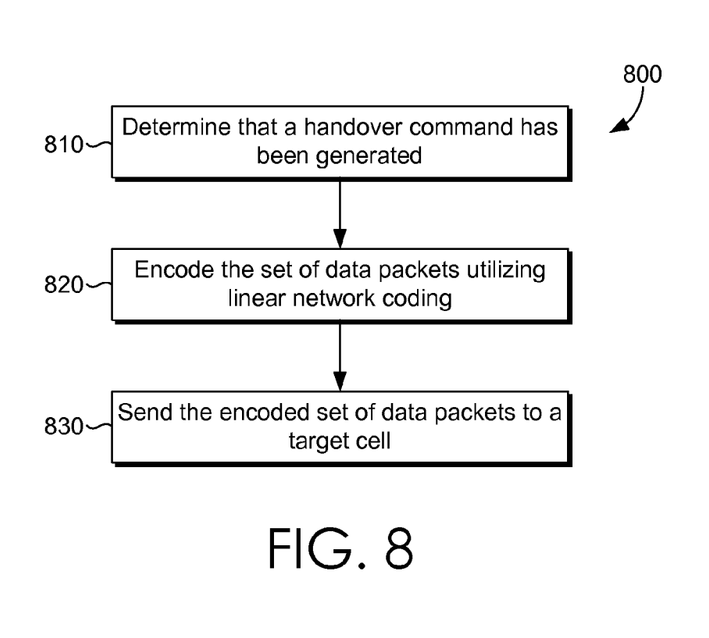
FIG. 8 is a flow diagram illustrating a method for encoding a set of data packets at a gateway of a telecommunications network, in accordance with embodiments of the present invention.

Referring now to FIG. 8, a flow diagram depicts an illustrative method 800 for encoding a set of data packets at a gateway of a telecommunications network, in accordance with an embodiment of the present invention. Initially, at block 810, a determination is made that a handover command has been generated. At block 820, the set of data packets are encoded utilizing linear network coding. At block 830, the encoded set of data packets are sent to a target cell. In embodiments, the encoded set of data packets may be sent to the target cell along a direct path and/or a forwarding path.

Figure 9:
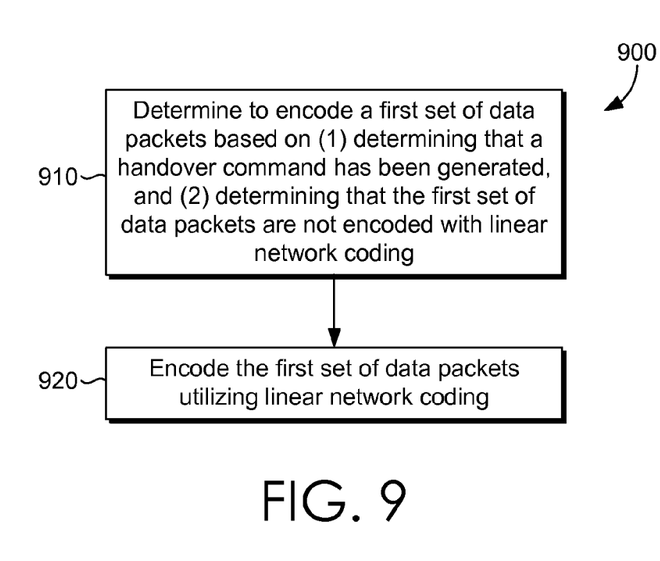
FIG. 9 is a flow diagram illustrating a method for encoding a set of data packets at a source cell of a telecommunications network, in accordance with embodiments of the present invention.

FIG. 9 shows a flow diagram depicting an illustrative method 900 for encoding a set of data packets at a source cell of a telecommunications network, in accordance with an embodiment of the present invention. Initially, at block 910, a determination is made to encode a first set of data packets based on determining that handover command has been generated and determining that the first set of data packets are not encoded with linear network coding. At block 920, the first set of data packets are encoded utilizing linear network coding.

Figure 10:
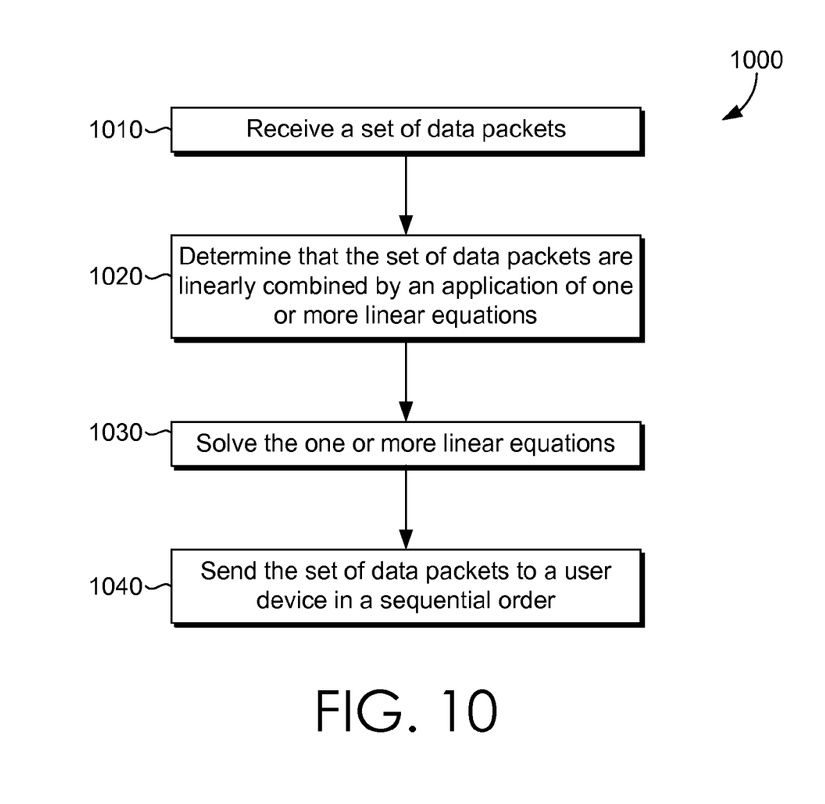
FIG. 10 is a flow diagram illustrating a method for decoding a set of data packets at a target cell of a telecommunications network, in accordance with embodiments of the present invention.

FIG. 10 shows a flow diagram depicting an illustrative method 1000 for decoding a set of data packets at a target cell of a telecommunications network, in accordance with an embodiment of the present invention. At block 1010 a set of data packets are received. At block 1020 a determination is made that the set of data packets are linearly combined by an application of one or more linear equations. At block 1030, the one or more linear equations are solved. At block 1040, the set of data packets are sent to the user device in a sequential order.

Many benefits are provided utilizing the present invention. Among various other benefits, the number of successful handovers may be increased and dropped connections due to missing neighbors may be decreased. Additionally, the probability of incorrect neighbor relations data provided from a user device to a source cell, such as an ECGI, may be decreased.

Many different arrangements of the various components depicted, as well as components not shown, are possible without departing from the scope of the claims below. Embodiments of our technology have been described with the intent to be illustrative rather than restrictive. Alternative means of implementing the aforementioned can be completed without departing from the scope of the claims below. Certain features and subcombinations are of utility and may be employed without reference to other features and subcombinations and are contemplated within the scope of the claims. For example, not all steps listed in the various figures need to be carried out in the specific order described.

The invention claimed is:

1. A computing system comprising:
   one or more procesors; and
   computer storage memory having computer-executable instructions embodied thereon that, when executed by the one or more processors, implement a method for encoding a first set of data packets at a gateway of a telecommunications network, the method comprising:
   receiving an indication that a handover of a user device is to occur, wherein data associated with the user device is to be transferred from a source cell to a target cell;
   based on the indication that the handover is to occur, encoding the first set of data packets utilizing linear network coding;
   sending the encoded first set of data packets to the target cell, wherein the encoded first set of data packets is decoded by the target cell to provide decoded data packets, and the decoded data packets are sent by the target cell to the user device in a sequential order; and
   based on a completion of the handover, determining not to encode a second set of data packets and sending the second set of data packets as unencoded data packets to the target cell.

2. The system of claim 1, wherein sending the encoded first set of data packets to the target cell comprises at least one of:
   sending at least a first portion of the encoded first set of data packets through a direct path between the gateway and the target cell; or
   sending at least a second portion of the encoded first set of data packets through a forwarding path to the target cell, the forwarding path comprising a path from the gateway to the source cell, and from the source cell to the target cell.

3. The system of claim 1, wherein the user device receives a message indicating an initiation of the handover, the handover being a transfer from the source cell to the target cell of data associated with at least one of an ongoing phone call or a data session at the user device.

4. The system of claim 1, wherein utilizing linear network coding comprises applying one or more linear equations to the first set of data packets in order to create a specified number of linear combinations of data packets included in the first set of data packets.

5. The system of claim 4, wherein the specified number of linear combinations of data packets is limited to a threshold number.

6. The system of claim 4, wherein the specified number of linear combinations of data packets is greater than or equal to a number of data packets included in the first set of data packets.

7. The system of claim 4, wherein the specified number of linear combinations of data packets is less than or equal to a number of data packets included in the first set of data packets.

8. The system of claim 1, wherein the method further comprising:
determining that the handover is complete such that the user device is associated with the target cell; and
based on determining that the handover is complete, determining not to encode the second set of data packets.

9. The system of claim 1, wherein the first set of data packets comprises data associated with at least one of an ongoing phone call at the user device or a data session at the user device.

10. A computer-implemented method for encoding a first set of data packets at a source cell of a telecommunications network, the method comprising:
determining to encode the first set of data packets based on determining that a handover of a user device is to occur, wherein data associated with the user device is to be transferred from the source cell to a target cell;
at a processor of a computing device, encoding the first set of data packets utilizing linear network coding;
sending the encoded first set of data packets to the target cell; and
based on a completion of the handover, determining not to encode a second set of data packets and sending the second set of data packets as unencoded data packets to the target cell.

11. The method of claim 10, wherein the encoding of the first set of data packets utilizing the linear network coding comprises applying one or more linear equations to the first set of data packets in order to create a specified number of linear combinations of data packets included in the first set of data packets.

12. The method of claim 10, wherein the determination to encode the first set of data packets is further based on determining that the first set of data packets is not encoded with linear network coding by analyzing whether the first set of data packets is linearly combined,
wherein if the first set of data packets is linearly combined, then it is determined that the first set of data packets is encoded with linear network coding, and
wherein if the first set of data packets is not linearly combined, then it is determined that the first set of data packets is not encoded with linear network coding.

13. The method of claim 10, further comprising:
receiving a third set of data packets; and
determining not to encode the third set of data packets based on determining that the third set of data packets is encoded with linear network coding.

14. The method of claim 13, wherein the first set of data packets, the second set of data packets, and the third set of data packets are received from a gateway of the telecommunications network.

15. The method of claim 14, further comprising:
sending the third set of data packets to the target cell.

16. The method of claim 10, further comprising the source cell sending a handover command to the user device, the handover command comprising a message to the user device indicating an initiation of the handover, the handover being a transfer from the source cell to the target cell of data associated with at least one of an ongoing phone call or a data session at the user device.

17. One or more non-transitory computer-readable media having computer-executable instructions embodied thereon that, when executed, perform a computer-implemented method for decoding an encoded set of data packets at a target cell associated with a handover of a user device within a telecommunications network, wherein data associated with the user device is transferred from a source cell to the target cell, the method comprising:
at the target cell associated with the handover:
receiving the encoded set of data packets;
determining that the encoded set of data packets is linearly combined by an application of one or more linear equations;
decoding the encoded set of data packets by solving the one or more linear equations;
sending the decoded set of data packets to the user device in a sequential order; and
subsequent to completion of the handover, receiving an unencoded set of data packets and sending the unencoded set of data packets to the user device.

18. The computer-readable media of claim 17, wherein at least a first portion of the encoded set of data packets is received at the target cell directly from a gateway and at least a second portion of the encoded set of data packets is received at the target cell from the source cell.

19. The computer-readable media of claim 18, wherein the encoded set of data packets comprises data associated with at least one of an ongoing phone call or a data session at the user device.

20. The computer-readable media of claim 17, wherein the method further comprises receiving, at the target cell, a linear network coding setting, wherein the linear network coding setting is provided to the source cell, the target cell, and a gateway included in the telecommunications network, and wherein the target cell decodes the encoded set of data packets by solving the one or more linear equations based on the linear network coding setting.

* * * * *